US008325666B2

United States Patent
Miki et al.

(10) Patent No.: US 8,325,666 B2
(45) Date of Patent: Dec. 4, 2012

(54) USER EQUIPMENT TERMINAL, BASE STATION APPARATUS, AND CHANNEL STATE INFORMATION COMMUNICATION METHOD

(75) Inventors: Nobuhiko Miki, Yokohama (JP); Yoshihisa Kishiyama, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 323 days.

(21) Appl. No.: 12/665,357

(22) PCT Filed: Jun. 16, 2008

(86) PCT No.: PCT/JP2008/060997
§ 371 (c)(1),
(2), (4) Date: Mar. 26, 2010

(87) PCT Pub. No.: WO2008/156061
PCT Pub. Date: Dec. 24, 2008

(65) Prior Publication Data
US 2010/0182923 A1    Jul. 22, 2010

(30) Foreign Application Priority Data

Jun. 19, 2007 (JP) .................................. 2007-161948

(51) Int. Cl.
H04W 4/00 (2009.01)
H04W 72/00 (2009.01)
(52) U.S. Cl. ..................................... 370/329; 455/452.2
(58) Field of Classification Search .................. 370/229, 370/232, 328, 329; 455/450, 452.1, 452.2
See application file for complete search history.

(56) References Cited

U.S. PATENT DOCUMENTS

2009/0141648 A1    6/2009 Imamura et al.

FOREIGN PATENT DOCUMENTS

| EP | 1 903 692 A1 | 3/2008 |
| EP | 1 919 231 A1 | 5/2008 |
| JP | 2007-274159 A | 10/2007 |
| WO | 2007/020994 A1 | 2/2007 |
| WO | 2007/023787 A1 | 3/2007 |

OTHER PUBLICATIONS

Hyung G. Myung, Junsung Lim, and David J. Goodman, "Single Carrier FDMA for Uplink Wireless Transmission", IEEE Vehicular Technology Magazine, vol. 1, No. 3, Sep. 2006, pp. 30-38.*
International Search Report w/translation from PCT/JP2008/060997 dated Sep. 16, 2008 (4 pages).
Written Opinion from PCT/JP2008/060997 dated Sep. 16, 2008 (4 pages).
Patent Abstracts of Japan; Publication No. 2007-274159 dated Oct. 18, 2007 (1 page).
3GPP TSG RAN WG1 #46bis; R1-062742; "CDM-based Multiplexing Method of Multiple ACK/NACK and CQI"; NTT DoCoMo, Inc. et al.; Seoul, Korea; Oct. 9-13, 2006 (6 pages).

(Continued)

Primary Examiner — Kerri Rose
(74) Attorney, Agent, or Firm — Osha Liang LLP

(57) ABSTRACT

A user equipment terminal estimates a channel state, encodes channel state information representing the estimated channel state, and transmits the channel state information over plural transmission time intervals. A base station apparatus receives the channel state information over plural transmission time intervals, decodes the channel state information, and assigns resources based on the channel state information. The present invention provides the user equipment terminal, the base station apparatus, and a channel state information communication method.

8 Claims, 12 Drawing Sheets

OTHER PUBLICATIONS

3GPP TSG RAN WG1 Meeting #48; R1-071245; "Approved Report of 3GPP TSG RAN WG1 #47bis v.2.0.0"; St. Louis, US; Feb. 12-16, 2007 (116 pages).

Chu, D.C.; "Ployphase codes with good periodic correlation properties", IEEE Trans. Inform. Theory; vol. IT-18; pp. 531-532; Jul. 1972 (2 pages).

3GPP TSG RAN WG1 Ad Hoc on LTE; R1-050822; "On Allocation of Uplink Pilot Sub-Channels in EUTRA SC-FDMA"; London, UK; Aug. 29-Sep. 2, 2005 (7 pages).

Mexican Office Action for Application No. MX/a/2009/014012, mailed on Jan. 17, 2011 (5 pages).

\* cited by examiner

USER EQUIPMENT TERMINAL, BASE STATION APPARATUS, AND CHANNEL STATE INFORMATION COMMUNICATION METHOD

TECHNICAL FIELD

The present invention relates to a field of mobile communications. More specifically, the present invention relates to a user equipment terminal, a base station apparatus, and a control information communication method in a mobile communication system.

BACKGROUND ART

In the field of mobile communications, research and development on a next generation communication system is rapidly progressing. In the communication system considered as of now, from the view point of broadening the coverage area while reducing PAPR (Peak-to-Average Power Ratio), it is proposed to use a single carrier scheme for uplink. In this communication system, radio resources for both uplink and downlink are properly assigned, as a form of a shared channel which is shared by plural users, according to communication conditions of respective users and the like. More specifically, a data signal of a user in uplink is transmitted on a physical uplink shared channel (PUSCH). The terms "channel" and "signal" may be used synonymously as long as there is no fear of confusion. A data signal of a user in downlink is transmitted on a physical downlink shared channel (PDSCH).

Processing for determining assignment is called scheduling. In order to properly perform scheduling in uplink, each user equipment terminal transmits a reference signal (also called a pilot channel) to a base station and the base station evaluates the uplink channel state based on reception quality of the reference signal. In addition, in order to perform scheduling in downlink, the base station transmits a reference signal to the user equipment terminal and the user equipment terminal reports to the base station information about the channel state (CQIs: Channel Quality Indicators) based on reception quality of the reference signal. Based on the CQIs reported from each user equipment terminal, the base station evaluates the downlink channel state to perform scheduling in downlink. The results of scheduling are transmitted to each user equipment terminal via a downlink control signal. This control signal is called a downlink L1/L2 control signal.

There are two types of uplink control signals: one is control information (called first control information, for the sake of convenience) that should be transmitted together with an uplink data signal and the other is control information (called second control information, for the sake of convenience) that is transmitted irrespective of the presence or absence of the uplink data signal. The first control information includes information necessary for demodulation of the data signal, such as a modulation scheme, a channel coding rate, and the like of the data signal. The second control information includes CQI information of a downlink channel, acknowledgement information (ACK/NACK) of a downlink data signal, information about a resource assignment request, and the like.

When a resource block (radio resource) is assigned for transmitting an uplink data signal, the first control information (and second control information as necessary) is transmitted in the resource block. On the other hand, when the uplink data signal is not transmitted, it is considered that the second control information is transmitted using a dedicated resource (dedicated band). In the following, an example of using the band is described below.

FIG. 1 shows a configuration of an uplink channel. FIG. 1 shows resources (plural resource blocks) for transmitting the physical uplink shared channel (PUSCH) as the uplink data signal, and resources (corresponding to the dedicated band) for a user to which resources for the PUSCH are not assigned to transmit the uplink control signal. The latter is called a physical uplink control channel (PUCCH). In the shown example, one or more of four resource blocks are assigned to users, a first hopping control signal and a second hopping control signal are provided in a certain transmission time interval (subframe), and a third hopping control signal and a fourth hopping control signal are provided in the following subframe. Each hopping control signal corresponds to the PUCCH. By performing hopping with respect to time and frequency in subframes, a greater diversity effect can be obtained. Each of the first through fourth hopping control signals may be occupied by one user or may be multiplexed by plural users. This transmission scheme of uplink control signals is described in 3GPP, R1-071245.

DISCLOSURE OF INVENTION

Problem(s) to be Solved by the Invention

When the L1/L2 control channel (first through fourth hopping control signals) is multiplexed by plural users without uplink data transmission, it is considered that orthogonality among the plural users is achieved using a CAZAC sequence. The CAZAC sequence has a characteristic in that a CAZAC code is orthogonal to a code with a cyclic shift of the CAZAC code. Accordingly, when the same CAZAC sequence is used among users and different cyclic shifts are applied to the users, orthogonality among the users can be achieved. FIG. 2 shows a configuration of the L1/L2 control channel, where the cyclic shift amount of zero (0) is applied to a user #1 and the cyclic shift amount of Δ is applied to a user #2.

In this manner, the L1/L2 control channel for users without uplink data transmission undergoes block-modulation using the CAZAC code in order to multiplex data for plural users. Thus, the number of bits available for transmission per user is determined in advance. For example, it is assumed that ten symbols per user can be transmitted in the subframe configuration shown in FIG. 2. When a QPSK data modulation and the coding rate of ½ are used, a user equipment terminal can transmit ten bits of information for each subframe.

As described above, the L1/L2 control channel for users without uplink data transmission includes CQI information, acknowledgement information (ACK/NACK), information about a resource assignment request, and the like. Regarding the CQI information, the user equipment terminal may transmit fine-grained CQIs for respective bands to be scheduled according to an instruction from the base station apparatus. In addition, the user equipment terminal may transmit CQIs for respective streams in the case of MIMO (multiple input multiple output) transmission using plural antennas. In these circumstances, the CQI information may exceed the number of bits which can be transmitted in each subframe.

For example, by increasing the coding rate, for example (using the coding rate of ¾, for example), it is possible to increase the number of bits which can be transmitted in each subframe. In this case, however, a problem of degrading reception quality may arise. For example, in W-CDMA (wideband code division multiple access), CQI information is repeatedly transmitted in the case where reception quality is degraded.

In view of this problem, it is a general object of the present invention to transmit channel state information (CQI information) without degrading reception quality.

Means for Solving the Problem(s)

In one aspect of the present invention, there is provided a user equipment terminal for estimating a channel state and transmitting, as control information transmitted irrespective of a presence or absence of an uplink data signal, channel state information representing the estimated channel state according to a single carrier scheme, including:

an encoding unit configured to encode the channel state information; and a transmitting unit configured to transmit the channel state information over plural transmission time intervals.

In another aspect of the present invention, there is provided a base station apparatus for receiving, as control information transmitted irrespective of a presence or absence of an uplink data signal, channel state information representing a channel state estimated by a user equipment terminal, including:

a receiving unit configured to receive the channel state information over plural transmission time intervals;

a decoding unit configured to decode the channel state information; and a resource assigning unit configured to assign resources based on the channel state information.

In another aspect of the present invention, there is provided a channel state information communication method for use in a mobile communication system using a single carrier scheme for uplink, including the steps of:

by a user equipment terminal, estimating a channel state;

encoding channel state information representing the estimated channel state;

transmitting, as control information transmitted irrespective of a presence or absence of an uplink data signal, the channel state information over plural transmission time intervals;

by a base station apparatus, receiving the channel state information over plural transmission time intervals;

decoding the channel state information; and assigning resources based on the channel state information.

Advantageous Effect of the Invention

According to an embodiment of the present invention, it is possible to transmit channel state information without degrading reception quality.

DETAILED DESCRIPTION OF THE PREFERRED EMBODIMENTS

Figure 1:
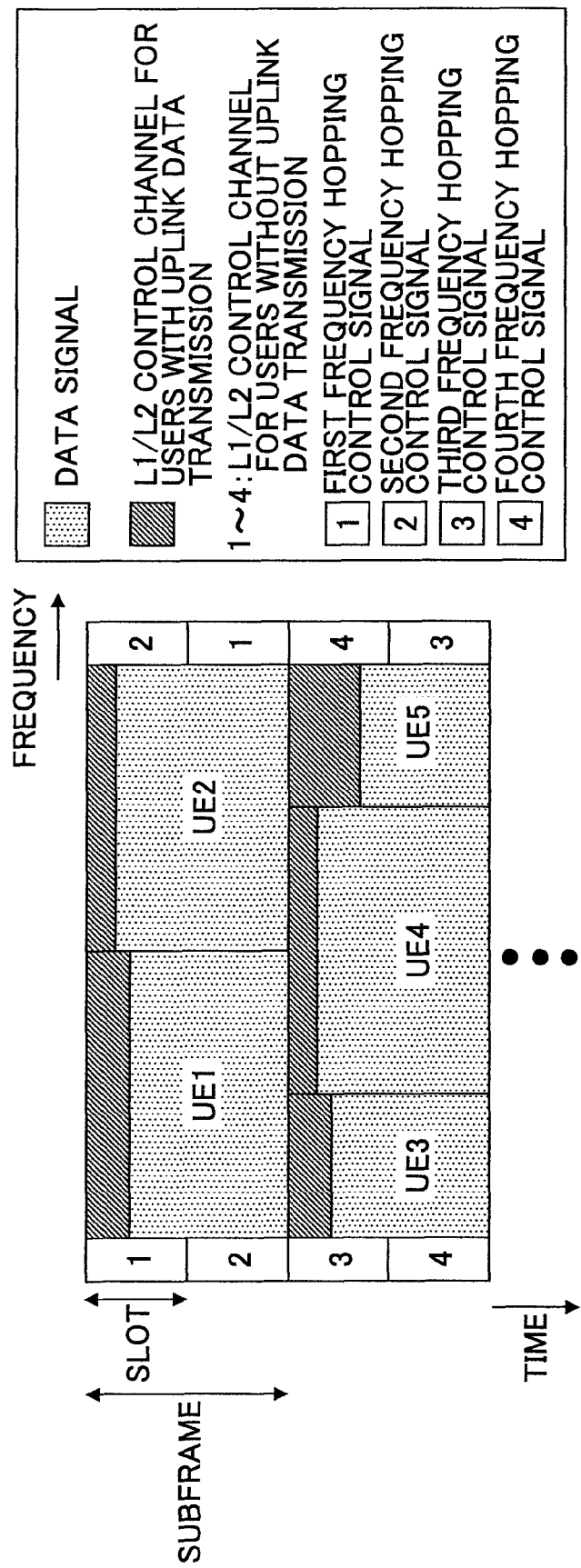
FIG. 1 shows a channel configuration used in a mobile communication system.

Description of Notations 10 user equipment terminal
101 CQI estimating unit
103, 103a, 103b channel encoding unit
105 modulation pattern generating unit
107 modulation unit
109 discrete Fourier transform unit (DFT)
111 subcarrier mapping unit
113 inverse fast Fourier transform unit (IFFT)
115 cyclic prefix (CP) adding unit
117 multiplexing unit
119 RF transmitting circuit
121 power amplifier
123 duplexer
125 CAZAC code generating unit
127 cyclic shift unit
129 block-spreading unit
131 frequency setting unit
133 reference signal generating unit
135 broadcast channel or dedicated L3 signaling demodulation unit
137 CQI arranging unit
20 base station apparatus
201 duplexer
203 RF receiving circuit
205 reception timing estimating unit
207 fast Fourier transform unit (FFT)
209 channel estimating unit
211 subcarrier demapping unit
213 frequency-domain equalizing unit
215 inverse discrete Fourier transform unit (IDFT)
217 demodulation unit
219, 219a, 219b decoding unit
221 scheduler
213 control unit

BEST MODE OF CARRYING OUT THE INVENTION

With reference to the accompanying drawings, embodiments of the present invention are described below.

First Embodiment

Approach for Encoding CQI Information at One Time

In a first embodiment of the present invention, a description is given below with regard to an approach in which a user equipment terminal encodes CQI information at one time (as a whole) and transmits the CQI information over plural subframes.

Figure 2:
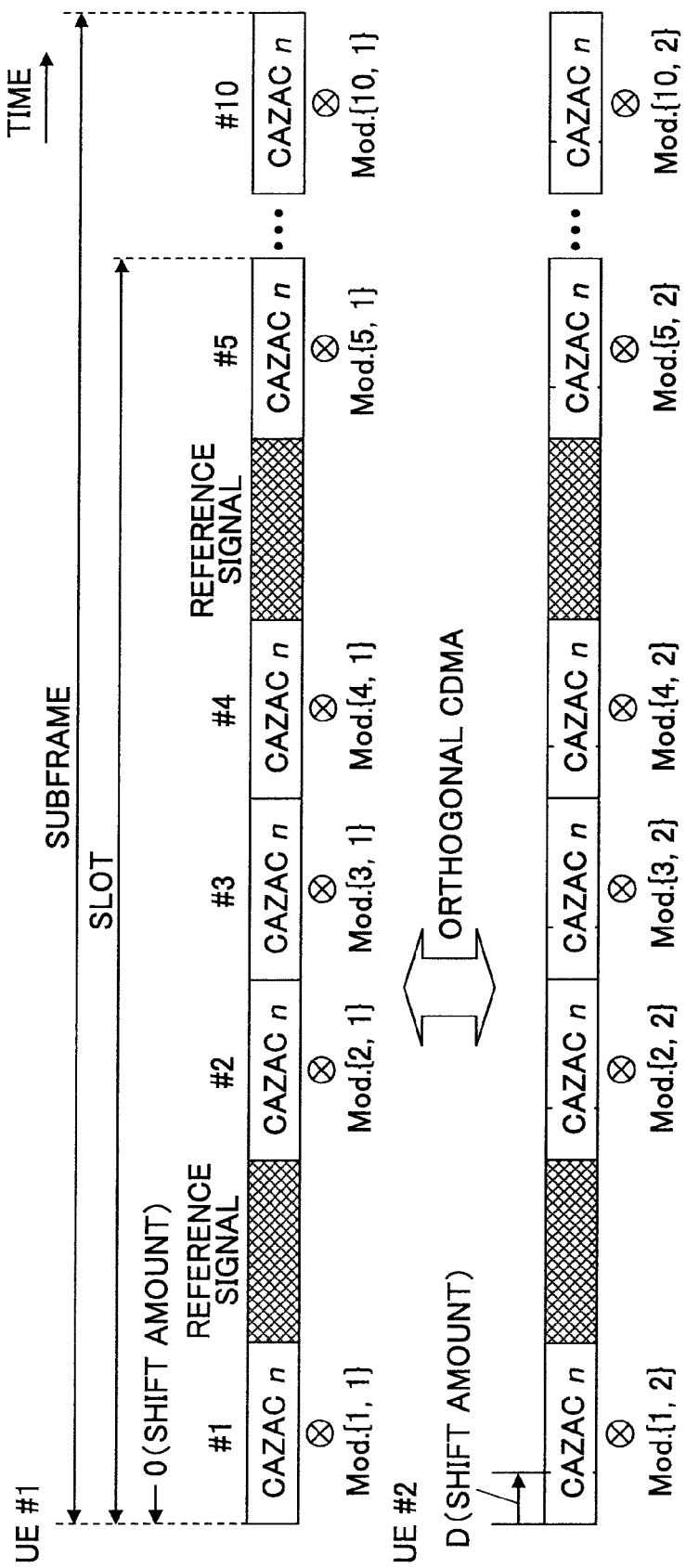
FIG. 2 shows a multiplexing scheme among users in an L1/L2 control channel for users without uplink data transmission.

For example, when a base station apparatus includes two antennas and twenty bits of CQI information is needed for each antenna, the channel configuration in FIG. 2 does not allow a user equipment terminal to transmit the CQI information in a single subframe. Since forty bits (20 (bits)*2(antennas)=40 (bits)) of information are needed as a whole, four subframes are needed to transmit the CQI information.

Figure 3:
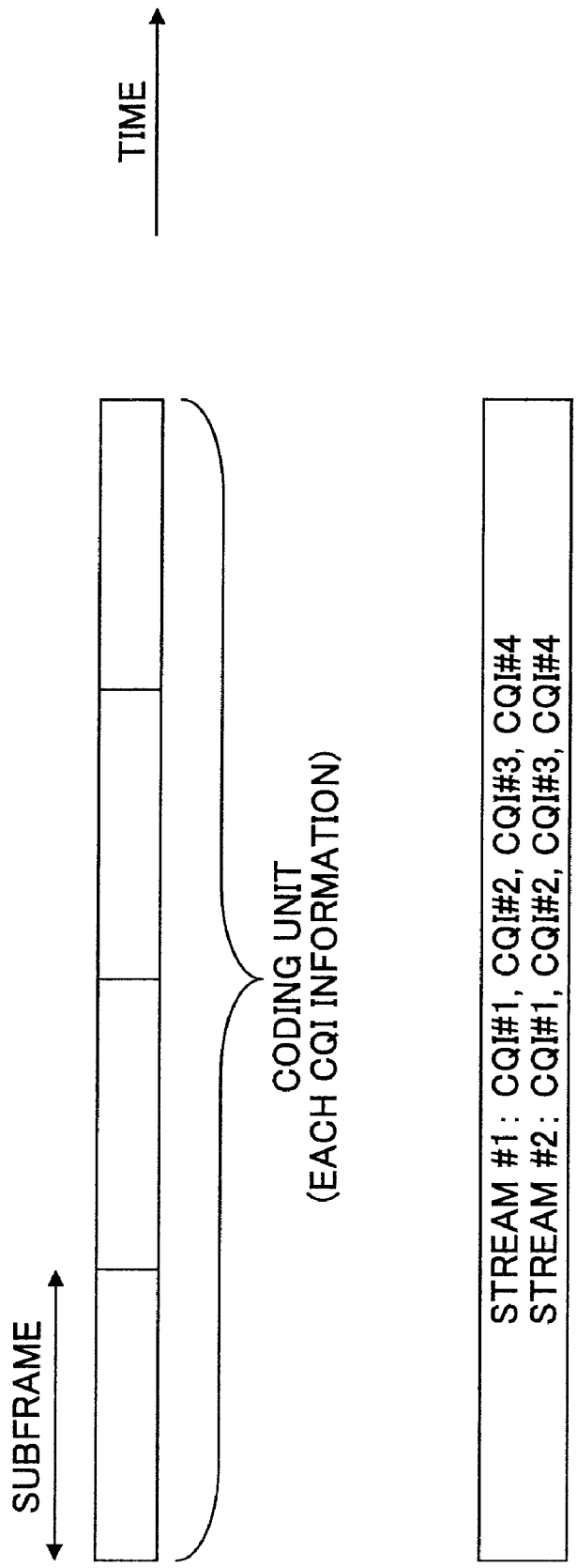
FIG. 3 shows a coding unit of a CQI encoding method in accordance with a first embodiment of the present invention.

FIG. 3 shows a coding unit of a CQI encoding method in accordance with the first embodiment of the present invention. In FIG. 3, the user equipment terminal encodes forty bits of information at one time and transmits the information with four subframes. In other words, encoding is performed for each set of CQI information. This first embodiment can increase the coding gain and allow for high quality transmission. Since the base station apparatus cannot decode CQI information until the last subframe is received, longer delay may develop with an increase in CQI information.

Figure 4:
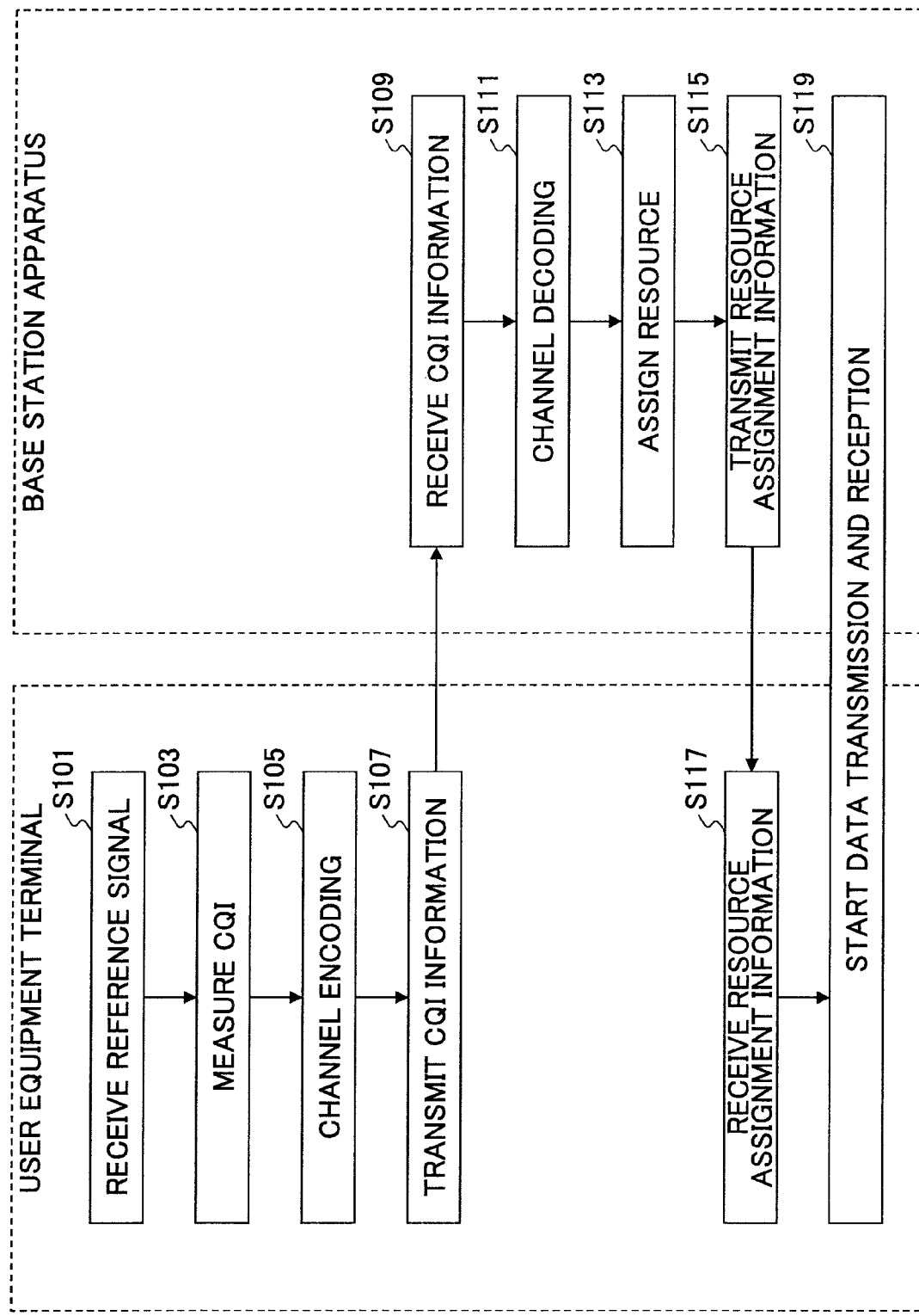
FIG. 4 shows a flowchart of the CQI encoding method in accordance with the first embodiment of the present invention.

FIG. 4 shows a flowchart of a CQI communication method in accordance with the first embodiment of the present invention.

The user equipment terminal receives a reference signal (S101), and then measures CQIs with the amount of information specified by the base station apparatus (S103). For example, the user equipment terminal measures an average CQI for the whole band, CQIs for respective bands (resource blocks) to be scheduled, CQIs for respective antennas, and the like. In the first embodiment, the measured CQI information is encoded at one time (S105), and then transmitted to the base station apparatus (S107).

The base station apparatus receives the CQI information which is encoded at one time until the last subframe is received (S109). When the last subframe is received, the base station apparatus decodes the CQI information (S111). The base station assigns resources based on the CQI information (S113), and then transmits resource assignment information to the user equipment terminal (S115). When the user equipment terminal receives the resource assignment information (S117), the user equipment terminal and the base station apparatus start data transmission and reception.

First Embodiment

Configuration of a User Equipment Terminal

Figure 5:
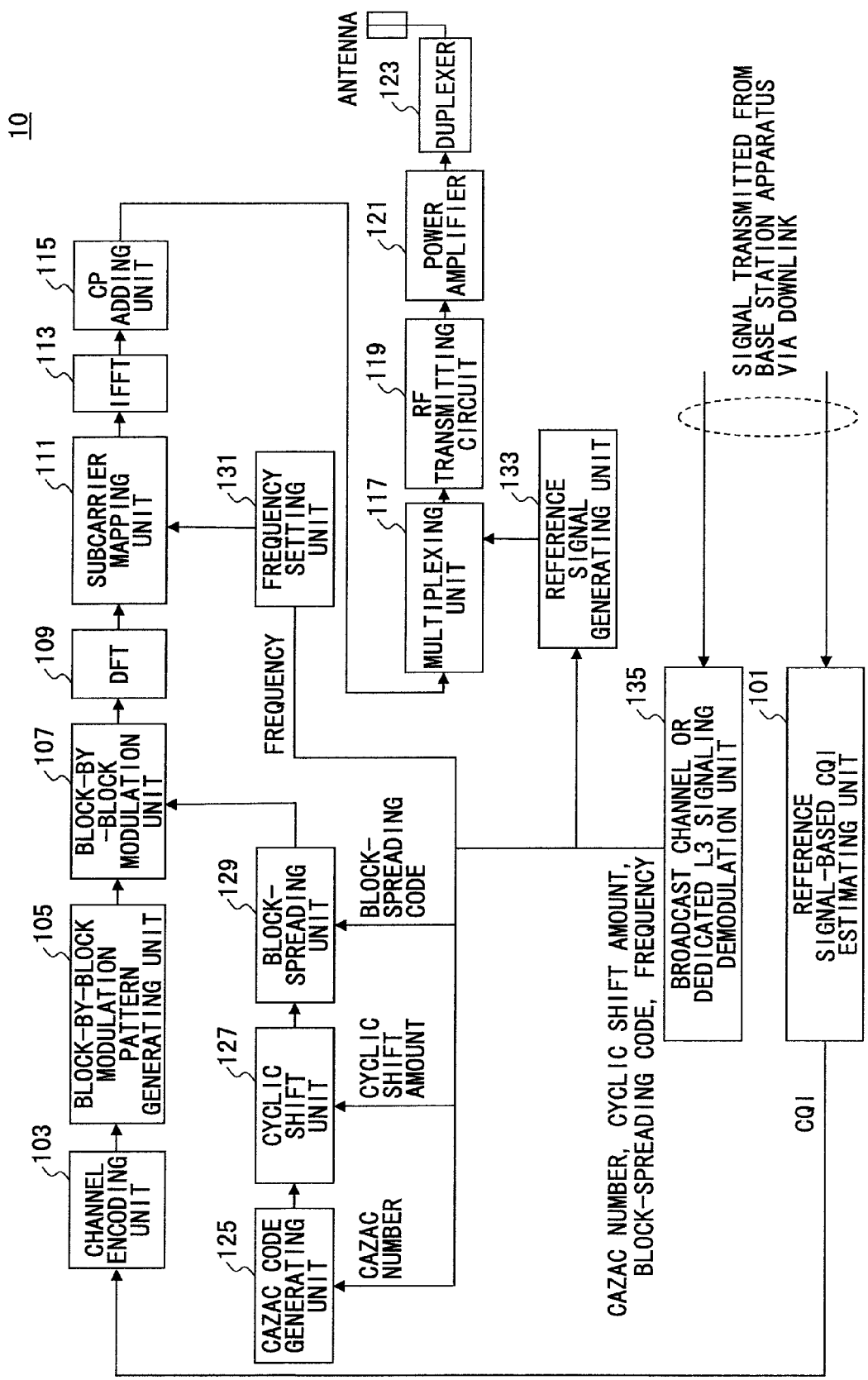
FIG. 5 shows a block diagram of a user equipment terminal in accordance with the first embodiment of the present invention.

FIG. 5 shows a block diagram of a user equipment terminal 10 in accordance with the first embodiment of the present invention. The user equipment terminal 10 includes a CQI estimating unit 101, a channel encoding unit 103, a modulation pattern generating unit 105, a modulation unit 107, a discrete Fourier transform unit (DFT) 109, a subcarrier mapping unit 111, an inverse fast Fourier transform unit (IFFT) 113, a cyclic prefix (CP) adding unit 115, a multiplexing unit 117, a RF transmitting circuit 119, a power amplifier 121, a duplexer 123, a CAZAC code generating unit 125, a cyclic shift unit 127, a block-spreading unit 129, a frequency setting unit 131, a reference signal generating unit 133, and a broadcast channel or dedicated L3 signaling demodulation unit 135.

The CQI estimating unit 101 receives a reference signal from the base station apparatus and estimates CQIs. The CQI estimating unit 101 may estimate an average CQI for the whole band or CQIs for respective resource blocks according to the instruction from the base station apparatus. Alternatively, the CQI estimating unit 101 may estimate CQIs for respective streams (paths for linking antennas).

The channel encoding unit 103 encodes the estimated CQI information at one time. For example, when the base station apparatus includes two antennas and twenty bits of CQI information is needed for each antenna, the channel encoding unit 103 encodes CQI information corresponding to four subframes at one time.

The block-by-block modulation pattern generating unit 105 arranges CQI information and acknowledgement information (ACK/NACK) according to a modulation pattern for each block.

The block-by-block modulation unit 107 applies different cyclic shift amounts to the CAZAC code sequence assigned to user equipment terminals to derive information sequences to be transmitted in a single subframe (or transmission time interval (TTI)). As described above, the information sequences are orthogonal among user equipment terminals.

The discrete Fourier transform unit (DFT) performs discrete Fourier transform to convert information in the time domain into information in the frequency domain.

The subcarrier mapping unit 111 performs mapping in the frequency domain. Specifically, when the frequency division multiplexing (FDM) scheme is used for multiplexing signals for plural user equipment terminals, the subcarrier mapping unit 111 performs mapping of signals according to bands which are set in the frequency setting unit 131. There are two types of FDM schemes: one is a localized FDM scheme and the other is a distributed FDM scheme. In the localized FDM scheme, a continuous band is assigned for each user on the frequency axis. In the distributed FDM scheme, a downlink signal is generated such that the signal includes discontinuous frequency components over a wide band (over the whole band for uplink control signal).

The inverse fast Fourier transform unit (IFFT) 113 performs inverse Fourier transform to convert the signal in the frequency domain back into a signal in the time domain.

The cyclic prefix (CP) adding unit 115 adds a cyclic prefix to information to be transmitted. The cyclic prefix (CP) functions as a guard interval for compensating multipath propagation delay and for compensating differences of reception timings among plural users in the base station apparatus.

The multiplexing unit 117 multiplexes the reference signal into information to be transmitted to generate a transmission symbol. The reference signal is a signal having a pattern which is known to both the transmission side and the reception side, and may be also referred to as a pilot signal, a pilot channel, a training signal, and the like.

The RF transmission circuit 119 performs processing such as digital-to-analog conversion, frequency conversion, band limitation, and the like for transmitting the transmission symbol with a radio frequency.

The power amplifier 121 adjusts transmission power.

The duplexer 123 properly separates a transmission signal and a received signal such that simultaneous communications are achieved.

The CAZAC code generating unit 125 generates a CAZAC code sequence according to a sequence number of a CAZAC code sequence used by the user equipment terminal.

The cyclic shift unit 127 derives another code by cyclically rearranging the CAZAC code sequence according to the cyclic shift amount of the CAZAC code sequence used by the user equipment terminal. For example, the CAZAC code is described in detail in D. C. Chu, "Polyphase codes with good periodic correlation properties", IEEE Trans. Inform. Theory, vol. IT-18, pp. 531-532, July 1972; and 3GPP, R1-050822, Texas Instruments, "On allocation of uplink sub-channels in EUTRA SC-FDMA".

The block spreading unit 129 prepares a set of predetermined number of factors (block spreading codes) and multiplies each block shown in FIG. 2 by each factor.

The frequency setting unit 131 specifies which frequency should be used by each user equipment terminal, when the frequency division multiplexing (FDM) scheme is applied for an uplink control signal from plural user equipment terminals.

The reference signal generating unit 133 prepares a reference signal to be included in the uplink control signal.

The broadcast channel or dedicated L3 signaling demodulation unit 135 receives from the base station apparatus a CAZAC number, a cyclic shift amount, a block spreading code, and a frequency used by the user equipment terminal on the broadcast channel or the dedicated L3 signaling, and then demodulates them.

First Embodiment

Configuration of a Base Station Apparatus

Figure 6:
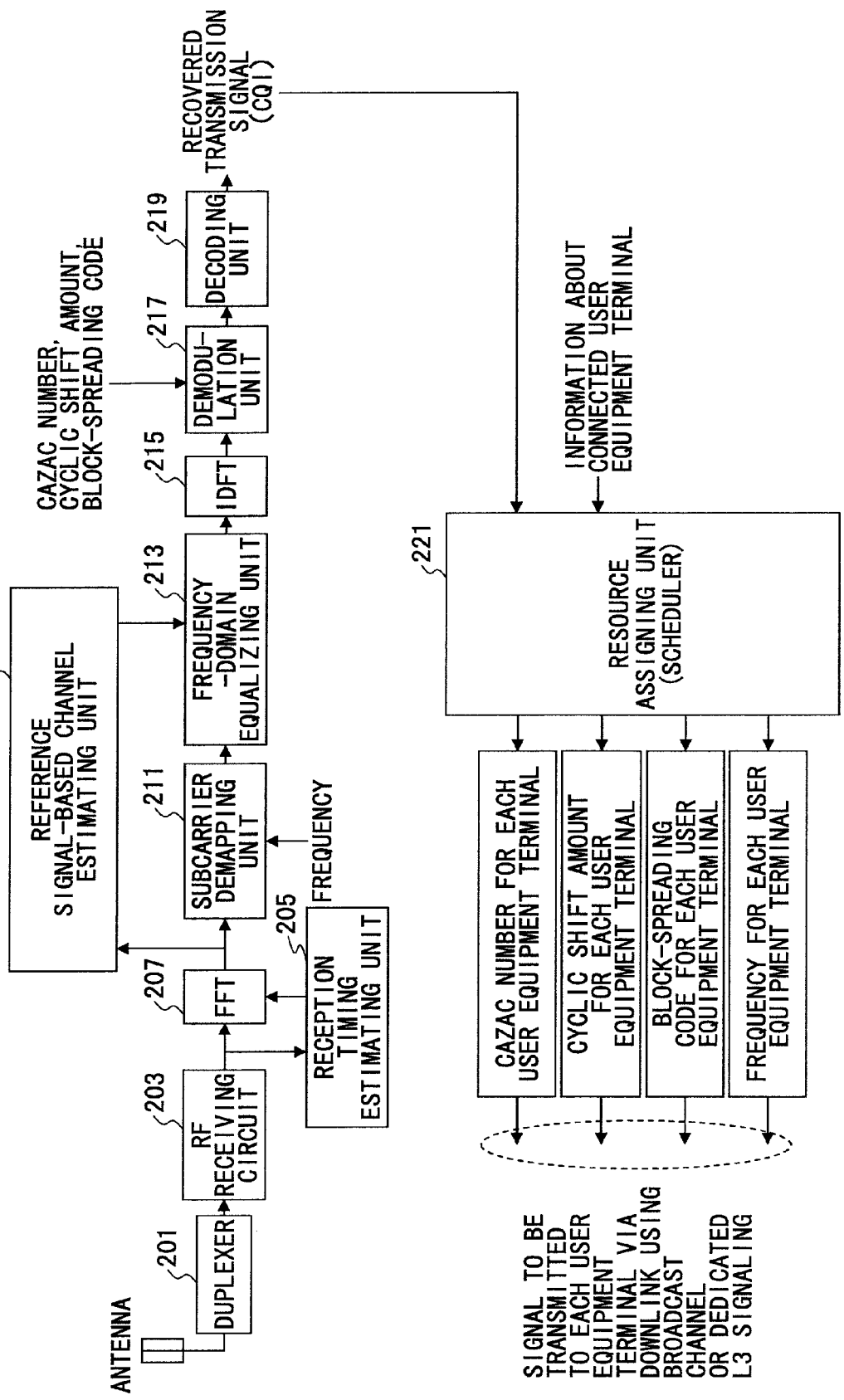
FIG. 6 shows a block diagram of a base station apparatus in accordance with the first embodiment of the present invention.

FIG. 6 shows a block diagram of a base station apparatus 20 in accordance with the first embodiment of the present invention. The base station apparatus 20 includes a duplexer 201, a RF receiving circuit 203, a reception timing estimating unit 205, a fast Fourier transform unit (FFT) 207, a channel estimating unit 209, a subcarrier demapping unit 211, a frequency-domain equalizing unit 213, an inverse discrete Fourier transform unit (IDFT) 215, a demodulation unit 217, a decoding unit 219, and a scheduler 211.

The duplexer 201 properly separates between a transmission signal and a received signal such that simultaneous communications are achieved.

The RF receiving circuit 203 performs processing such as digital-to-analog conversion, frequency conversion, band limitation, and the like for processing the received symbol in baseband.

The reception timing estimating unit 205 identifies reception timings based on a synchronization channel or a reference signal in the received signal.

The fast Fourier transform unit (FFT) 207 performs Fourier transform to convert information in the time domain into information in the frequency domain.

The channel estimating unit 209 estimates an uplink channel state based on reception state of the uplink reference signal and outputs information for performing channel compensation.

The subcarrier demapping unit 211 performs demapping in the frequency domain. This process is performed corresponding to mapping in the frequency domain performed in each user equipment terminal.

The frequency-domain equalizing unit 213 performs equalization of the received signal based on the channel estimation value.

The inverse discrete Fourier transform unit (IDFT) 215 performs inverse discrete Fourier transform to convert the signal in the frequency domain back into a signal in the time domain.

The demodulation unit 217 demodulates the received signal.

The decoding unit 219 decodes the demodulated received signal. In the first embodiment, the decoding unit 219 outputs CQI information for the downlink channel at one time.

The scheduler 211 determines downlink resource assignment based on the level of the channel state information (CQI) for the downlink channel and other criteria. In addition, the scheduler 211 determines uplink resource assignment based on the reception result of the reference signal transmitted from each user equipment terminal and other criteria. The determined assignment information is output as scheduling information. The scheduling information specifies a frequency, a time, a transmission format (data modulation scheme and channel coding rate), and the like used for transmitting signals.

The scheduler also determines a CAZAC number, a cyclic shift amount, a block spreading code, and a frequency to be assigned to each user equipment terminal. The determined information is transmitted to each user equipment terminal on the broadcast channel or the dedicated L3 signaling.

Second Embodiment

Approach for Encoding CQI Information for Each Subframe

In a second embodiment of the present invention, a description is given below with regard to an approach in which a user equipment terminal divides CQI information into information items, each of which can be transmitted in a single subframe, and encodes one information item for each subframe, when the CQI information exceeds the number of bits which can be transmitted in each subframe.

Figure 7:
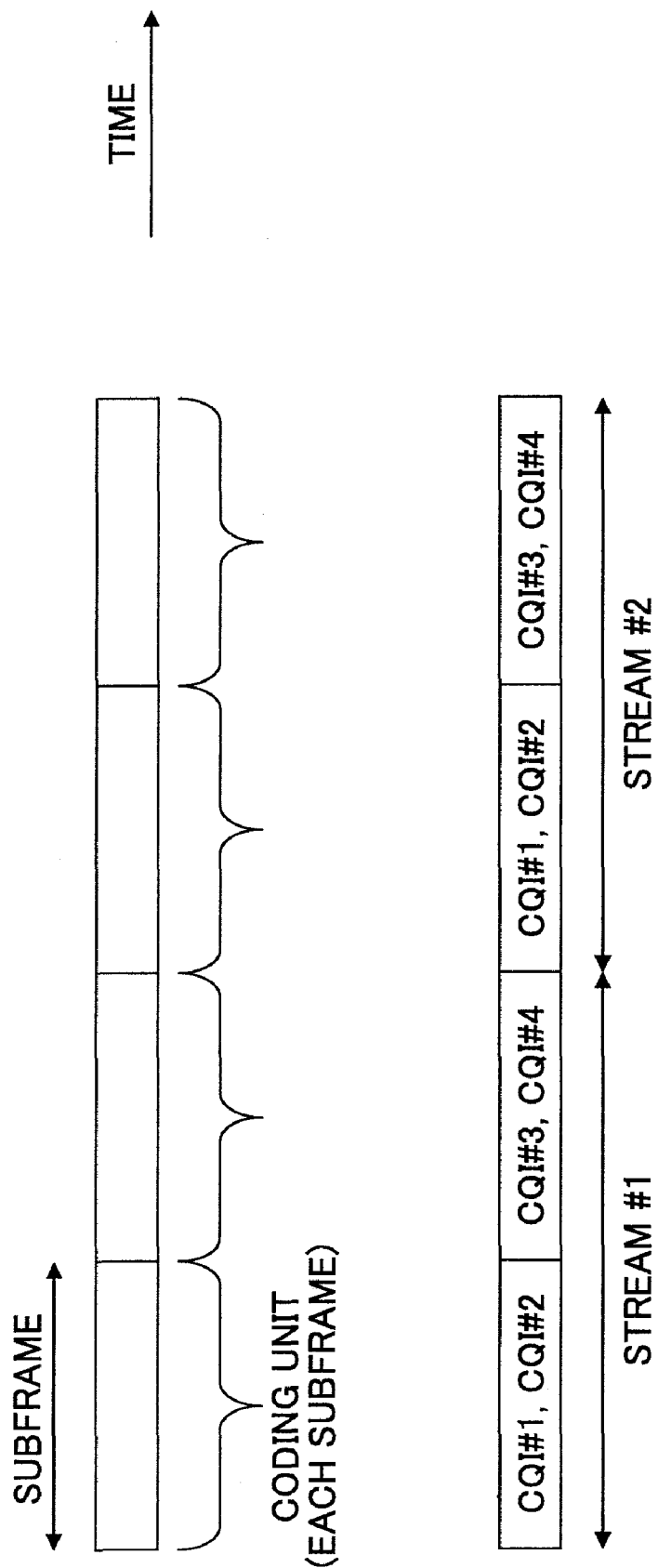
FIG. 7 shows a coding unit of a CQI encoding method in accordance with a second embodiment of the present invention.

FIG. 7 shows a coding unit of a CQI encoding method in accordance with the second embodiment of the present invention. In FIG. 7, when forty bits are needed for CQI information, the user equipment terminal divides forty bits of information into information items, each of which can be transmitted in a single subframe, and encodes one information item for each subframe. The whole CQI information is transmitted with four subframes. In other words, encoding is performed for each subframe. According to this second embodiment, the base station apparatus can decode the information item upon receiving one subframe, and thus delay can be reduced irrespective of an increase in CQI information.

In order to further reduce delay, the user equipment terminal may arrange the CQI information in descending order of the channel state (from a better channel state to a poorer channel state), encode the CQI information in descending order of the channel state, and transmit the CQI information in descending order of the channel state. This allows the base station apparatus to perform scheduling in descending order of the channel state. Accordingly, when the base station apparatus completes resource assignment, the base station apparatus need not decode unnecessary CQI information.

A CQI communication method in accordance with the second embodiment of the present invention is performed according to the flowchart shown in FIG. 4. According to the second embodiment, in step S105, the user equipment terminal performs encoding for each subframe. In step S107, the user equipment terminal transmits to the base station apparatus the CQI information which is encoded for each subframe. In step S109, the base station apparatus receives the CQI information for each subframe. In step S111, the base station apparatus decodes the CQI information for each subframe.

Second Embodiment

Configuration of a User Equipment Terminal

Figure 8:
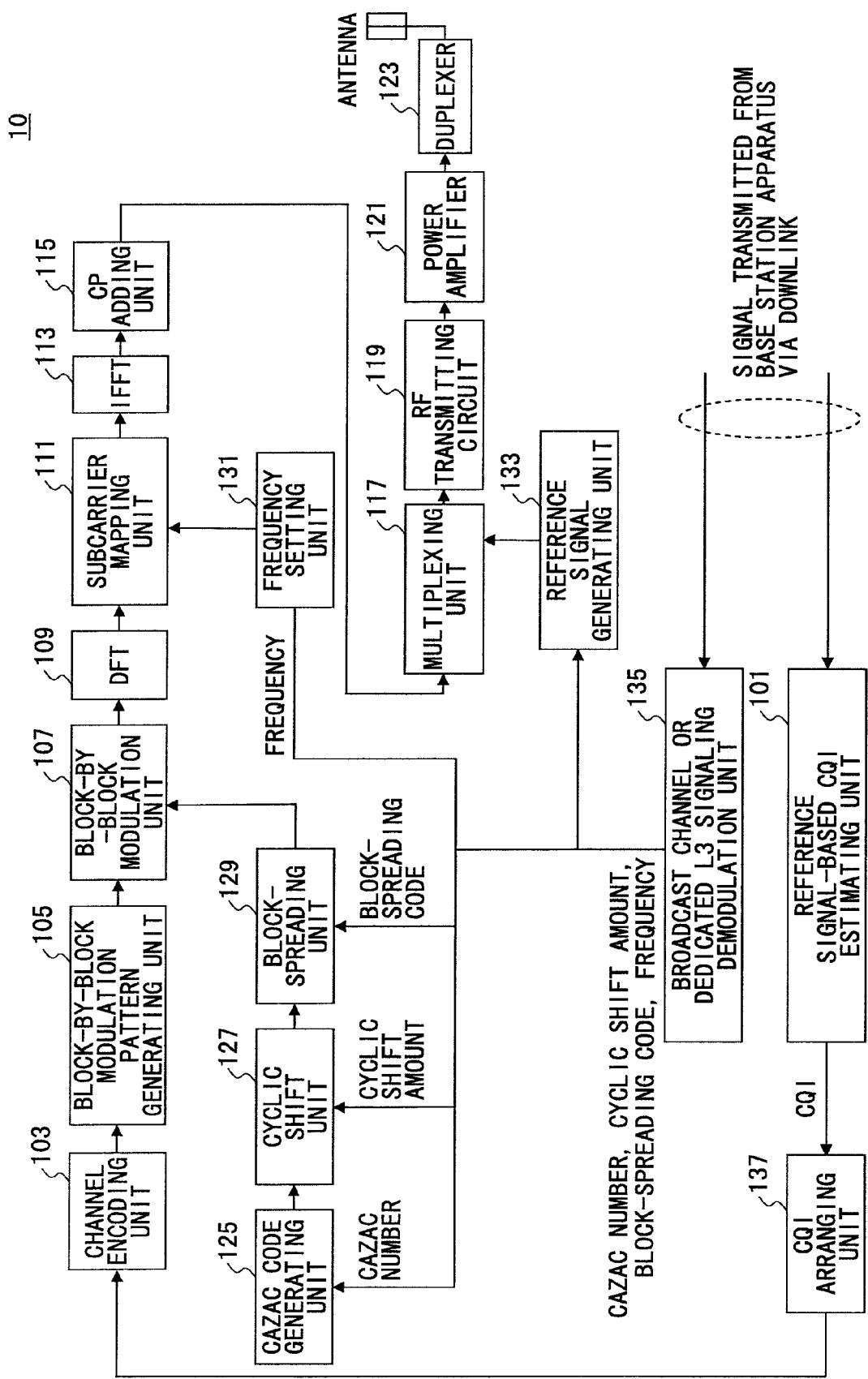
FIG. 8 shows a block diagram of a user equipment terminal in accordance with the second embodiment of the present invention.

FIG. 8 shows a block diagram of a user equipment terminal 10 in accordance with the second embodiment of the present invention. The user equipment terminal 10 shown in FIG. 8 may include a CQI arranging unit 137 in addition to the components shown in FIG. 5.

According to the second embodiment, the channel encoding unit 103 divides the estimated CQI information into information items, each of which can be transmitted in a single subframe, and encodes one information item for each subframe.

When the user equipment terminal 10 includes the CQI arranging unit 137, the CQI arranging unit 137 arranges the CQI information in descending order of the channel state. In this case, the channel encoding unit 103 encodes the CQI information in descending order of the channel state. The CQI information is transmitted to the base station apparatus in descending order of the channel state.

Second Embodiment

Configuration of a Base Station Apparatus

Figure 9:
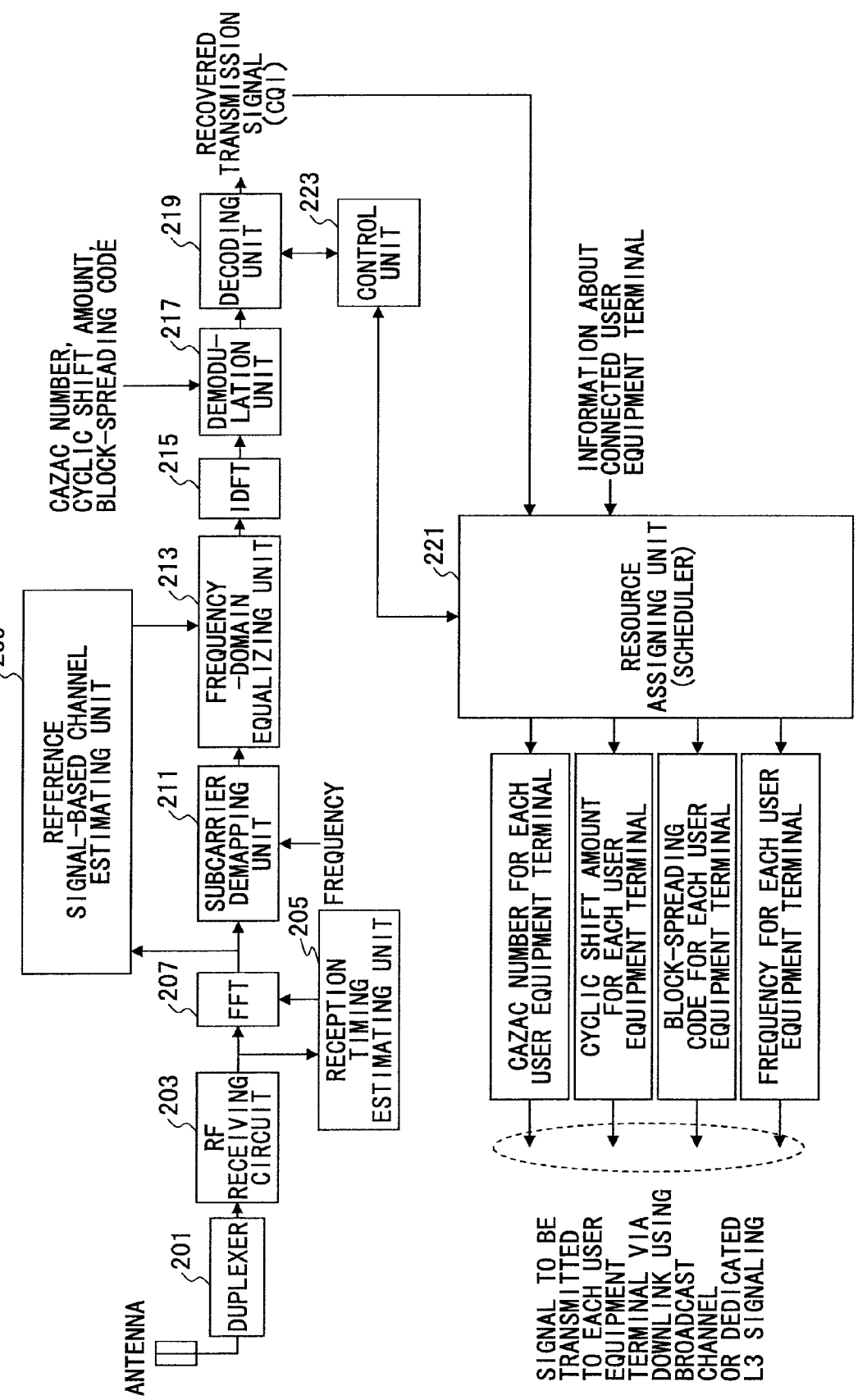
FIG. 9 shows a block diagram of a base station apparatus in accordance with the second embodiment of the present invention.

FIG. 9 shows a block diagram of a base station apparatus 20 in accordance with the second embodiment of the present invention. The base station apparatus 20 shown in FIG. 9 may include a control unit 223 in addition to the components shown in FIG. 6.

According to the second embodiment, the decoding unit 219 outputs downlink CQI information for each subframe.

When the user equipment terminal arranges the CQI information in descending order of the channel state, the decoding unit 219 decodes the CQI information in descending order of the channel state and supplies the CQI information to the scheduler 221. The scheduler 221 can assign resources in descending order of the channel state. Accordingly, when the scheduler 221 completes resource assignment, CQI information in other bands associated with these resources is not necessary. For this reason, the base station apparatus may include the control unit 223. When resource assignment is completed, the control unit 223 instructs the decoding unit 219 to stop decoding the CQI information in other bands associated with these resources. It should be noted that the control unit 223 may be integrated into the scheduler 221.

Third Embodiment

Approach for Encoding CQI Information for Each Stream

A third embodiment of the present invention relates to MIMO transmission where a user equipment terminal or a base station apparatus performs transmission using plural antennas. In the MIMO transmission, CQI information is needed for each stream (path for linking antennas), which causes an increase in CQI information. The user equipment terminal divides CQI information into information items for respective streams and encodes the CQI information by one information item for each stream, when the CQI information exceeds the number of bits which can be transmitted in each subframe.

Figure 10:
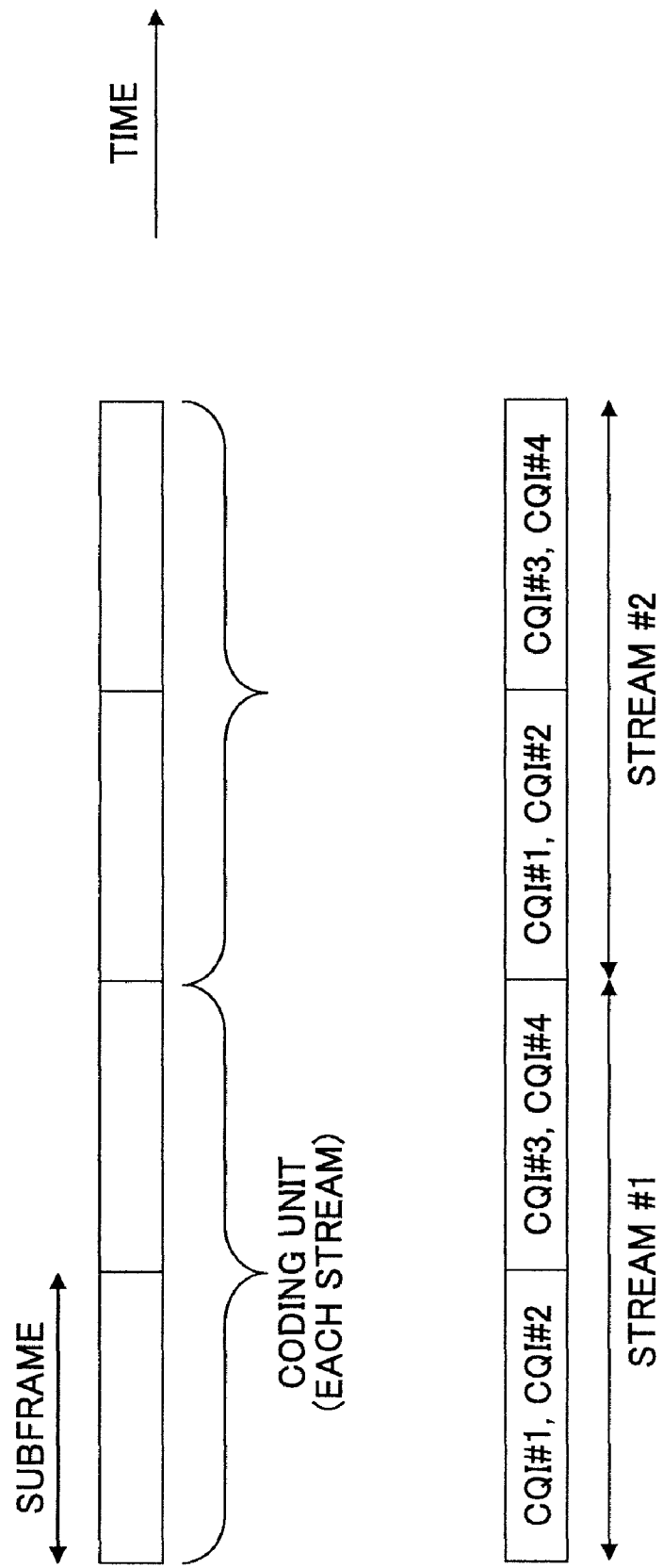
FIG. 10 shows a coding unit of a CQI encoding method in accordance with a third embodiment of the present invention.

FIG. 10 shows a coding unit of a CQI encoding method in accordance with the third embodiment of the present invention. In FIG. 10, when forty bits are needed for CQI information, the user equipment terminal divides forty bits of information into information items for respective streams and encodes the CQI information by one information item for each stream. When the base station apparatus includes two antennas, the user equipment terminal divides forty bits of information into information items with twenty bits and encodes the CQI information by each information item with twenty bits. The whole CQI information is transmitted with four subframes. In other words, encoding is performed for each stream. According to this third embodiment, the base station apparatus can decode CQI information for one stream upon receiving two subframes.

A CQI communication method in accordance with the third embodiment of the present invention is performed according to the flowchart shown in FIG. 4. According to the third embodiment, in step S105, the user equipment terminal performs encoding for each stream. In step S107, the user equipment terminal transmits to the base station apparatus the CQI information which is encoded for each stream. In step S109, the base station apparatus receives the CQI information for each stream. In step S111, the base station apparatus decodes the CQI information for each stream.

Third Embodiment

Configuration of a User Equipment Terminal

Figure 11:
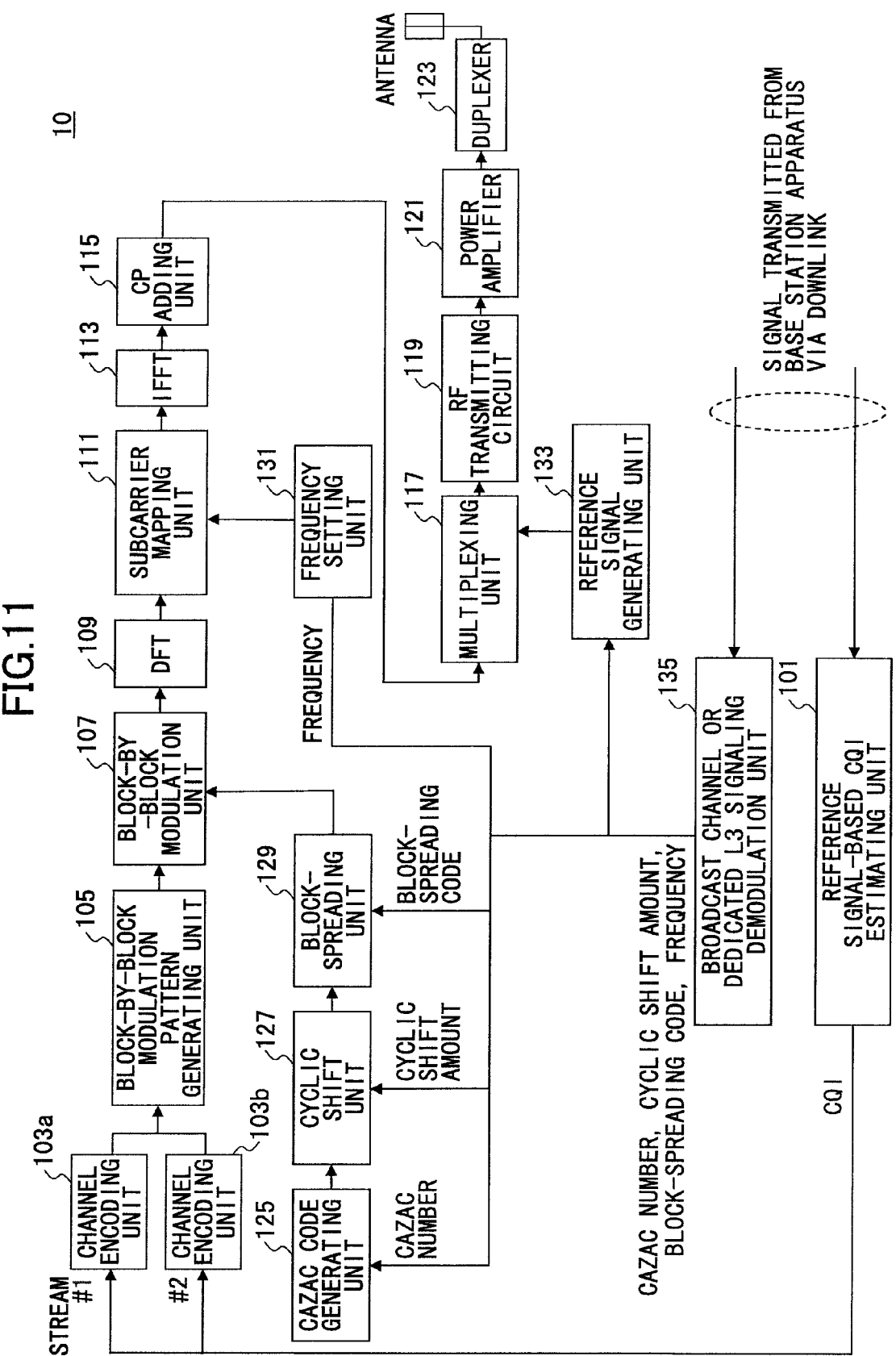
FIG. 11 shows a block diagram of a user equipment terminal in accordance with the third embodiment of the present invention.

FIG. 11 shows a block diagram of a user equipment terminal 10 in accordance with the third embodiment of the present invention. The user equipment terminal 10 shown in FIG. 11 may include plural channel encoding units 103a and 103b corresponding to the number of streams.

According to the third embodiment, each of the channel encoding units 103a and 103b encodes CQI information for each stream. The CQI information for each stream is transmitted to the base station apparatus. Although the user equipment terminal 10 includes the channel encoding units 103a and 103b corresponding to the number of streams, one channel encoding unit may perform encoding for each stream. In addition, the user equipment terminal may include plural modulation pattern generating units 105 and plural modulation units 107 corresponding to the number of streams, in order to process modulation for each stream in parallel.

Third Embodiment

Configuration of a Base Station Apparatus

Figure 12:
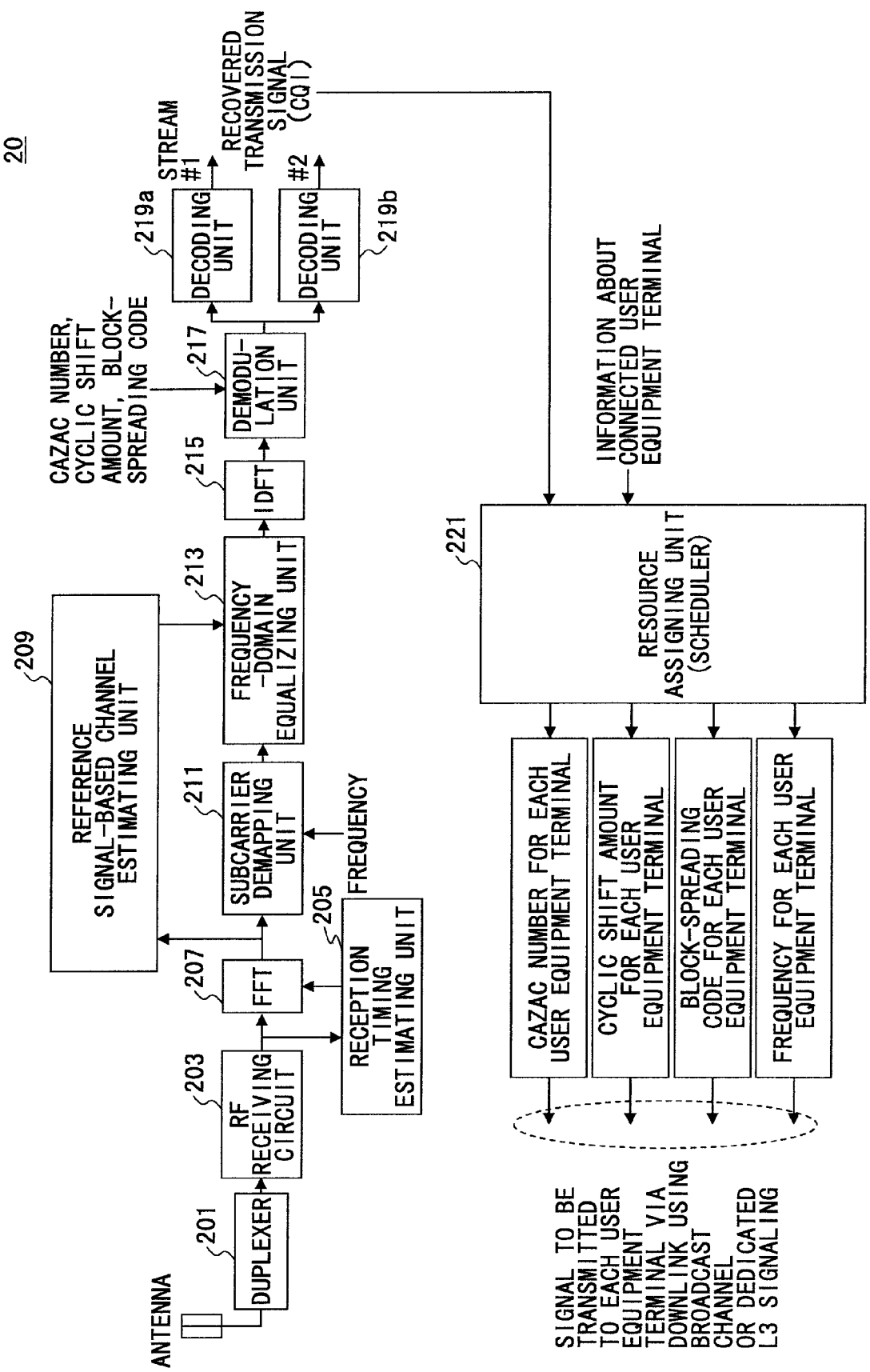
FIG. 12 shows a block diagram of a base station apparatus in accordance with the third embodiment of the present invention.

FIG. 12 shows a block diagram of a base station apparatus 20 in accordance with the third embodiment of the present invention. The base station apparatus 20 may include plural decoding units 219a and 219b corresponding to the number of streams.

According to the third embodiment, each of the decoding units 219a and 219b outputs downlink CQI information for each stream. When each of the decoding units 219a and 219b decodes the CQI information for each stream, each of the decoding units 219a and 219b instructs the scheduler 221 to assign resources for the corresponding stream. Although the base station apparatus 20 includes the decoding units 219a and 219b corresponding to the number of streams, one decoding unit may perform decoding for each stream.

The present invention is not limited to these embodiments. The present invention may be modified within the scope of the claims.

This international patent application is based on Japanese Priority Application No. 2007-161948 filed on Jun. 19, 2007, the entire contents of which are incorporated herein by reference.

The invention claimed is:

1. A user equipment terminal for estimating a channel state and transmitting, as control information transmitted irrespective of a presence or absence of an uplink data signal, channel state information representing the estimated channel state according to a single carrier scheme, comprising:
   an encoding unit configured to encode the channel state information; and
   a transmitting unit configured to transmit the channel state information over plural transmission time intervals,
   wherein the encoding unit encodes the channel state information to be transmitted over the plural transmission time intervals at one time, when the channel state information exceeds the number of bits which can be transmitted in a single transmission time interval.

2. The user equipment terminal as claimed in claim 1, wherein:
   the encoding unit encodes the channel state information for each stream to be transmitted over the plural transmission time intervals at one time, when the user equipment terminal or the base station apparatus performs transmission using plural antennas and the channel state information for each stream exceeds the number of bits which can be transmitted in a single transmission time interval.

3. A user equipment terminal for estimating a channel state and transmitting, as control information transmitted irrespective of a presence or absence of an uplink data signal, channel state information representing the estimated channel state according to a single carrier scheme, comprising:
   an encoding unit configured to encode the channel state information; and
   a transmitting unit configured to transmit the channel state information over plural transmission time intervals,
   wherein the encoding unit divides the channel state information into information items, each of which can be transmitted in a single transmission time interval, and encodes the channel state information by each of the information items, each of which can be transmitted in the single transmission time interval.

4. The user equipment terminal as claimed in claim 3, further comprising:
   an arranging unit configured to arrange the channel state information in descending order of the channel state, wherein
   the encoding unit encodes the channel state information in descending order of the channel state, and
   the transmitting unit transmits the channel state information in descending order of the channel state.

5. A base station apparatus for receiving, as control information transmitted irrespective of a presence or absence of an uplink data signal, channel state information representing a channel state estimated by a user equipment terminal, comprising:
   a receiving unit configured to receive the channel state information over plural transmission time intervals, the channel state information being transmitted over the plural transmission time intervals, when the channel state information exceeds the number of bits which can be transmitted in a single transmission time interval;
   a decoding unit configured to decode the channel state information received over the plural transmission time intervals at one time; and
   a resource assigning unit configured to assign resources based on the channel state information.

6. The base station apparatus as claimed in claim 5, wherein:
   when the channel state information is arranged in descending order of the channel state, the channel state information is divided into information items, each of which can be transmitted in a single transmission interval, and the channel state information is encoded by each of the information items, each of which can be transmitted in the single transmission time interval,
   the decoding unit decodes the channel state information for each single transmission interval, and
   the resource assigning unit assigns resources in descending order of the channel state and, upon completing resource assignment, instructs the decoding unit to stop decoding the channel state information associated with the resources.

7. The base station apparatus as claimed in claim 5,
   wherein when the user equipment terminal or the base station apparatus performs transmission using plural antennas, the channel state information for each stream exceeds the number of bits which can be transmitted in a single transmission time interval, and the channel state information for each stream to be transmitted over the plural transmission time intervals is encoded at one time, and
   wherein the decoding unit decodes the channel state information for each stream received over the plural transmission time intervals at one time and, upon completing decoding the stream, instructs the resource assigning unit to start resource assignment associated with the stream.

8. A channel state information communication method for use in a mobile communication system using a single carrier scheme for uplink, comprising the steps of:
   by a user equipment terminal,
   estimating a channel state;
   encoding channel state information representing the estimated channel state to be transmitted over plural transmission time intervals at one time, when the channel state information exceeds the number of bits which can be transmitted in a single transmission time interval;
   transmitting, as control information transmitted irrespective of a presence or absence of an uplink data signal, the channel state information over the plural transmission time intervals;
   by a base station apparatus,
   receiving the channel state information over plural transmission time intervals;
   decoding the channel state information received over the plural transmission time intervals at one time; and
   assigning resources based on the channel state information.

* * * * *